United States Patent
Weiss et al.

(10) Patent No.: US 10,610,844 B2
(45) Date of Patent: Apr. 7, 2020

(54) REMOVABLE BASKET FOR CATALYTIC REACTOR

(71) Applicant: IFP Energies nouvelles, Rueil-Malmaison (FR)

(72) Inventors: Wilfried Weiss, Lyons (FR); Cecile Plais, Les Haies (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/164,377

(22) Filed: Oct. 18, 2018

(65) Prior Publication Data

US 2019/0111372 A1    Apr. 18, 2019

(30) Foreign Application Priority Data

Oct. 18, 2017 (FR) .................................... 17/59.796

(51) Int. Cl.
    *B01J 8/00*    (2006.01)
    *B01J 8/02*    (2006.01)
    (Continued)

(52) U.S. Cl.
    CPC ............ *B01J 8/0085* (2013.01); *B01D 46/30* (2013.01); *B01D 53/86* (2013.01); *B01J 8/0242* (2013.01);
    (Continued)

(58) Field of Classification Search
    CPC . B01J 19/32; B01J 8/0085; B01J 8/025; B01J 8/0242; B01J 8/0278; B01J 8/0292;
    (Continued)

(56) References Cited

U.S. PATENT DOCUMENTS

| 3,607,000 A | 9/1971 | Beal |
| 7,314,603 B2 | 1/2008 | Filippi |

(Continued)

FOREIGN PATENT DOCUMENTS

| EP | 1300190 A1 | 4/2003 |
| FR | 3043339 | * 5/2017 |

(Continued)

OTHER PUBLICATIONS

Machine Translation of FR 3043339 (Year: 2017).*
Search Report in corresponding FR 1759796 dated Mar. 19, 2018.

*Primary Examiner* — Lessanework Seifu
(74) *Attorney, Agent, or Firm* — Millen, White, Zelano and Branigan, P.C.

(57) ABSTRACT

The present invention relates to a removable basket for a catalytic reactor comprising a horizontal base (1) and a plurality of vertical side walls (2) and/or at least one ellipsoidal side wall, and a plurality of vertical chimneys (3, 4) that are open at their lower (5) and upper (6) ends, each chimney comprising a lower part (7) comprising the lower end fastened to the base and extending between the side walls, in which a first chimney comprises an upper part (8) extending above the side walls, and the upper part of the first chimney is suitable for being inserted into a lower part of a chimney of another removable basket. The present invention also relates to a filtration and distribution device comprising said removable basket, a reactor comprising said device, and a hydrotreating and/or hydrocracking process using said reactor.

14 Claims, 5 Drawing Sheets

(51) Int. Cl.
    *B01D 46/30*     (2006.01)
    *C10G 45/00*     (2006.01)
    *B01D 53/86*     (2006.01)
    *C10G 47/00*     (2006.01)
    *B01J 19/32*     (2006.01)

(52) U.S. Cl.
    CPC ............ *B01J 8/0278* (2013.01); *C10G 45/00* (2013.01); *C10G 47/00* (2013.01); *B01J 8/0292* (2013.01); *B01J 19/32* (2013.01); *B01J 2208/00814* (2013.01); *B01J 2208/023* (2013.01); *B01J 2219/32279* (2013.01); *B01J 2219/32293* (2013.01); *B01J 2219/3306* (2013.01); *B01J 2219/3322* (2013.01); *C10G 2300/1044* (2013.01)

(58) Field of Classification Search
    CPC .... B01J 2219/32279; B01J 2219/32293; B01J 2208/00814; B01D 46/30
    See application file for complete search history.

(56) References Cited

U.S. PATENT DOCUMENTS

| | | |
|---|---|---|
| 8,329,974 B2 | 12/2012 | Koudil |
| 2007/0181486 A1 | 8/2007 | Ashliman |

FOREIGN PATENT DOCUMENTS

| | | |
|---|---|---|
| JP | 2000051879 A | 2/2000 |
| WO | 2007023225 A1 | 3/2007 |

\* cited by examiner

REMOVABLE BASKET FOR CATALYTIC REACTOR

The present description relates to removable baskets for the filtration and distribution of gas and liquid in chemical reactors operating with co-current gas-liquid downflow.

Such reactors are used in the field of refining, such as for hydrotreatments that require high-pressure hydrogen flows and operating with heavy liquid feedstocks that may contain impurities constituted by clogging solid particles.

Indeed in certain cases the liquid feedstock, or the mixture of the liquid feedstock and a gas rich in hydrogen under temperature and pressure conditions necessary for hydrotreating, contains impurities that may become deposited on the catalyst bed itself, and over time reduce the interstitial volume of this catalyst bed and thus lead to a progressive increase in pressure drop. In extreme cases, in particular at the end of the cycle, blockage of the catalyst bed is noted, manifested by a very rapid increase in pressure drop, thus disrupting the flow through the reactor.

The pressure drop may become such that the operator is obliged to stop the reactor and replace a part or all of the catalyst, which of course results in a considerable reduction in the duration of the cycles of the process.

Among the clogging feedstocks, there may be mentioned the mixtures of hydrocarbons that may contain a non-negligible proportion of unsaturated or polyunsaturated acetylene or diene compounds, or a combination of these different compounds, the total proportion of unsaturated compounds in the feedstock being capable of reaching 90% by weight. By way of representative example of the feedstocks to which the present description relates, there may be mentioned pyrolysis gasoline; pyrolysis denoting a thermal cracking process well known to a person skilled in the art. Heavy hydrocarbon cuts may also be mentioned, in particular gasoils, vacuum gasoils, atmospheric residues or vacuum residues, and deasphalted oils. These heavy cuts can originate from direct distillation of crude oil or originate from conversion processes such as visbreaking, coking, deasphalting, catalytic cracking or hydrocracking.

The aforementioned heavy hydrocarbon cuts can also contain various impurities, in particular sediments (e.g. measured by IP 375 and 390), metals (e.g. Ni, V, Fe, Ca, etc.) and derivatives thereof such as iron or calcium derivatives that can contribute to clogging of the catalyst beds. Additional impurities may be formed in the feedstock when the feedstock comes into contact with hydrogen. For example, Fe sulphide can be formed in situ from Fe (e.g. mineral or organic of the naphthenate type) contained in the feedstock. Cuts of the residues type also contain asphaltenes, which are chemical compounds often described as precursors of coke.

Blocking of a part of the catalyst bed can be due to several mechanisms. Directly, the presence of particles in the feedstock flow can result in a blockage by deposit of said particles within the catalyst bed, this deposit having the effect of reducing the void fraction. Indirectly, the formation of a layer of products originating from the chemical reactions, typically coke, but possibly other solid products derived from the impurities present in the feedstock, products which are deposited on the surface of the catalyst grains, can also contribute to the reduction of the void fraction of the catalyst bed.

In addition, as the deposition of the clogging particles can take place within the catalyst bed in a more or less random manner, uneven distribution of the void fraction of this catalyst bed may result, which will be manifested by the creation of preferential paths. These preferential paths are extremely prejudicial from the hydrodynamic point of view, as they disrupt more or less seriously the even flow of the phases within the catalyst bed, and may result in unevenness in the progress of the chemical reaction, as well as with regard to temperature (for example radial temperature difference, hot spot.)

STATE OF THE ART

In order to prevent premature clogging of the catalyst bed, various technical solutions have been developed. These solutions are based on the use of a filtration system arranged upstream of the catalyst bed (in the direction of flow of the fluids). For example, the following documents may be mentioned.

Document FR 2889973 describes a distributor tray directly supporting a filtration medium and thus providing the functions of both filtration with respect to the catalyst bed placed downstream and distribution of the gas and liquid. The filtration distributor tray according to FR 2889973 comprises chimneys having perforated holes (or slots) in the middle of the filtration bed, which may present difficulties in the case of a blockage of the filtration bed close to the holes. This blocking of the filtration bed would result in blocking the chimney with two consequences: an imbalance in the distribution of the liquid flow below the distributor tray, and a risk of damage to the chimneys during removal of the distributor tray with chimneys stuck to, and agglomerated with, the filtration bed.

Document FR 2959677 describes a set of removable baskets containing filtration particles, these baskets being placed on the distributor tray so as to facilitate mounting and removing the filtration device without involving the distributor tray. In order to ensure mechanical integrity of the system of baskets, said removable baskets are firmly held by bolting or by a fastening system, thus complicating the mounting and dismantling operations.

Document FR 2996465 describes an assembly for the filtration and distribution of a gas and a liquid comprising a distributor tray equipped with distribution chimneys and an upper perforated filtration support, on which a filtration bed is arranged through which the chimneys of the distributor tray pass. The filtration support is held mechanically to the distributor tray by means of an elbow piece placed between said support and the distributor tray or by a screwing system. The main difficulty in implementation of this system resides in filling the filter medium, which must be done once the support is installed in the reactor and especially during dismantling of the system, which involves emptying the support beforehand from inside the reactor, made even more difficult in the case of agglomeration (or caking) of the filter medium.

Document FR 3043339 describes a filtration and distribution assembly comprising a distributor tray on which chimneys are fastened and on which filtration baskets are placed, each basket being provided with a support means cooperating with a chimney of the distributor tray in order to support the filtration basket. However, this system only comprises a limited thickness of filtration medium and thus has a limited lifetime of the filtration function. The purpose of the present description is to overcome the aforementioned deficiencies.

SUMMARY

A first purpose of the present description is to provide stackable removable baskets, allowing in particular several filtration beds to be superimposed, and a better use of the space situated below the upper base of the reactor. A second purpose of the present description is the extension of the lifetime of the catalyst bed situated downstream of the distributor tray.

According to a first aspect, the aforementioned purposes, as well as other advantages, are obtained by a removable basket suitable for containing and holding at least one filtration medium for the filtration and distribution of a gaseous phase and a liquid phase, and suitable for being arranged upstream of a fixed catalyst bed of a reactor operating with co-current gas-liquid downflow, said removable basket comprising:

a substantially horizontal base and a plurality of substantially vertical side walls and/or at least one (substantially vertical) ellipsoidal side wall, the base and/or at least one side wall being permeable to gas and liquid, and a plurality of substantially vertical chimneys open at their lower and upper ends, each chimney comprising a lower part comprising the lower end fastened to the base and extending between the side walls, and a first chimney of the removable basket comprising an upper part extending above the side walls, and in which the upper part of the first chimney is suitable for being inserted into a lower part of a chimney of another removable basket of the same type (e.g. in a second chimney of a removable basket according to the first aspect).

As the first chimney of the removable basket is capable of being inserted into a chimney of another removable basket, this first chimney can provide a guiding function when the removable baskets are stacked. It is thus possible to superimpose several tiers of removable baskets upstream of a catalyst bed of the reactor, such as in the space below the upper base of the reactor. In addition, given that the risks of blockage of the filtration bed mainly relate to the removable baskets arranged at the level of the upper tiers, the clogged removable baskets remain accessible for their replacement without the need to resort to the removal of additional baskets. Furthermore, the blockage of a basket causes the redistribution of the fluids in the downstream baskets without endangering the filtration function overall. The first chimney can also provide a structural reinforcement function during the stacking and the formation of the tiers of removable baskets.

The flow of the fluids in the event of blockage of a filtration bed is also improved, given that the removable baskets are provided with chimneys. Thus, the distribution of the gas in the central part of the reactor is increased, improving the evenness of flow of the phases within the catalyst bed. In addition, if a filtration bed were to become blocked, the liquid could flow back up along the walls of the removable basket, then spill over outside the removable basket into the space between two removable baskets, and/or flow into an adjacent removable basket, and/or flow with the gas into a chimney of the removable basket, thus preserving a balanced distribution of the fluids below the distributor tray. According to one or more embodiments, a part of the liquid can also spill outside into the annular space between the removable baskets and the wall of the reactor.

According to one or more embodiments, the height of the upper part of the first chimney is smaller than or equal to the height of the lower part of a second chimney of the removable basket. Thus, a first removable basket can be arranged on a second removable basket so that the base of the first removable basket rests on the side walls of the second removable basket.

According to one or more embodiments, the chimneys (e.g. the lower and upper parts of the chimneys) form tubes with circular cross sections, and the diameter of the lower part of a second chimney of the removable basket is greater than the diameter of the upper part of the first chimney. Thus, the manufacturing steps of the chimneys are reduced and the flow of the gas is optimized. It is understood that the chimneys of the removable basket can be of any shape, with the proviso that the upper parts of the chimneys of the removable basket are suitable for being inserted into the lower parts of the chimneys of another removable basket according to the first aspect.

According to one or more embodiments, the removable basket also comprises a second chimney comprising an upper part extending above the side walls, and in which the upper part of the second chimney is suitable for being inserted into a lower part of a chimney of another removable basket (e.g. into a first chimney of a removable basket according to the first aspect). As the second chimney of the removable basket also extends above the walls, the guiding for the superimposition of the baskets as well as the structural integrity of the assembly formed by the tiers of the removable baskets are improved.

According to one or more embodiments, the height of the upper part of the second chimney is smaller than or equal to the height of the lower part of the first chimney.

According to one or more embodiments, the diameter of the lower part of the first chimney is greater than the diameter of the upper part of the second chimney.

According to one or more embodiments, the removable basket comprises at least three substantially vertical side walls. Thus, the baskets can be in the shape of a triangular prism, rectangular parallelepiped (e.g. square), hexagonal prism, etc. According to one or more embodiments, the three side walls form a triangular prism. According to one or more embodiments, the removable basket comprises four substantially vertical side walls. According to one or more embodiments, the four side walls form a rectangular (e.g. square) parallelepiped. According to one or more embodiments, the removable basket comprises six substantially vertical side walls. According to one or more embodiments, the six side walls form a hexagonal prism. According to one or more embodiments, the ellipsoidal (substantially vertical) side wall forms a circular cylinder.

According to one or more embodiments, the removable basket comprises four substantially vertical side walls forming a rectangular parallelepiped comprising a cavity consisting of two adjacent square-based rectangular parallelepipeds, each of the first and second chimneys being arranged at the centre of one of the square-based rectangular parallelepipeds. Thus, the removable baskets of one tier can be arranged in a configuration perpendicular to that of the removable baskets of an adjacent tier, while significantly reducing the space left free between the removable baskets. According to one or more embodiments, the two opposite first side walls have a width substantially equal to twice the width of the other two side walls, in order to thus form said cavity consisting of two adjacent square-based rectangular parallelepipeds.

According to one or more embodiments, the heights of the upper parts of the first and second chimneys are substantially equal. Thus, stacking of the tiers of removable baskets is facilitated, because a greater number of possible orientations of the removable baskets is obtained. According to one or more embodiments, the heights of the upper parts of the first and second chimneys are different. Thus, the baskets can be pre-configured in order to restrict their stacking according to predefined orientations.

According to one or more embodiments, at least one of the plurality of chimneys has a height less than or equal to twice the height of the side walls (e.g. the height of the upper part of said chimney is substantially less than or equal to the height of the side walls).

According to one or more embodiments, at least one of the plurality of chimneys of the removable basket is permeable to gas.

According to one or more embodiments, the upper ends of the plurality of chimneys are suitable for being situated above the layer of filtration medium. Thus, the liquid is guided in order to pass preferentially through the filtration bed.

According to one or more embodiments, at least one of the upper ends of the plurality of chimneys of the removable basket comprises a screen, making it possible in particular to limit splashes of unfiltered liquid into the chimneys for the passage of gas of the baskets.

According to one or more embodiments, the base and/or the side walls comprise a peripheral reinforcement. Thus, the structural integrity of the removable basket is reinforced. According to one or more embodiments, the base and/or the side walls comprise an openwork separation element, such as a metal screen, for example of the Johnson type known to a person skilled in the art, or a metal plate pierced with apertures, in which the size of the mesh of the screen or of the apertures is such that the latter is strictly less than the average dimension of the constituent elements of the filtration medium borne by the removable basket. According to one or more embodiments, the removable basket also comprises at least one reinforcement suitable for stiffening the removable basket. According to one or more embodiments, the at least one reinforcement constitutes an attachment point of the removable basket for handling the removable basket. According to one or more embodiments, the at least one reinforcement connects at least one element selected from the base, the walls and the chimneys of the removable basket to at least one other element selected from the base, the walls and the chimneys of the removable basket. Thus, the structural integrity of the removable basket is reinforced and the handling of the removable basket is facilitated.

According to one or more embodiments, the removable basket comprises at least one layer of filtration medium.

According to one or more embodiments, the removable basket comprises a perforated protective screen, optionally removable, configured in order to be arranged above the upper layer of filtration medium. Thus, the filtration medium remains arranged inside the removable basket and is not expelled during the steps of handling and steps of operation of the reactor. In particular, the protective screen allows removable baskets filled with filtration medium to be withdrawn by orienting them at an angle with respect to the horizontal so as to facilitate their passage through an exit aperture formed in the reactor (for example an inspection hatch), without loss of filtration medium.

According to one or more embodiments, the removable basket also comprises a connecting element for connecting a side wall of the removable basket to a side wall of an adjacent removable basket. Thus, the structural integrity of the tiers of removable baskets is reinforced. According to one or more embodiments, the connecting element comprises a tab (e.g. a plate) for at least partially covering the space between the removable basket and the adjacent removable basket. According to one or more embodiments, the connecting element is firmly fixed to the removable basket. Thus, the liquid is guided in order to pass preferentially through the filtration bed and not between two removable baskets.

According to one or more embodiments, the removable basket is suitable for being placed on distribution means of a perforated tray of the reactor, the removable basket comprising support means cooperating with at least one of the distribution means of the perforated tray. Thus, the mounting and dismantling operations are still facilitated, given that the removable baskets are supported directly by the perforated tray.

According to a second aspect, the aforementioned purposes, as well as other advantages, are obtained by a removable basket suitable for containing and holding at least one filtration medium for the filtration and distribution of a gaseous phase and a liquid phase, and suitable for being arranged upstream of a fixed catalyst bed of a reactor operating with co-current gas-liquid downflow, said removable basket comprising:
  a substantially horizontal base and a plurality of substantially vertical side walls and/or at least one ellipsoidal (substantially vertical) side wall, the base and/or at least one side wall being permeable to gas and liquid; and
  a plurality of substantially vertical chimneys open at their lower and upper ends, each chimney comprising a lower part comprising the lower end fastened to the base and extending between the side walls, and a first chimney of the removable basket comprising an upper part extending above the side walls, and
in which
  the lower and upper parts of the chimneys have a substantially tubular shape, so that the shape defined by the cross section of the upper part of the first chimney can be surrounded by the shape defined by the cross section of the lower part of a second chimney of the removable basket (all the embodiments according to the first aspect are applicable to the embodiments according to the second aspect).

According to one or more embodiments, a second chimney of the removable basket comprises an upper part extending above the side walls, and the shape defined by the cross section of the lower part of the first chimney can surround the shape defined by the cross section of the upper part of the second chimney.

According to a third aspect, the aforementioned purposes, as well as other advantages, are obtained by a device for the filtration and distribution of a gaseous phase and a liquid phase, suitable for being arranged upstream of a fixed catalyst bed of a reactor operating with co-current gas-liquid downflow, said removable basket comprising:
  a perforated tray extending in a horizontal plane on which are fastened distribution means, such as vertical chimneys optionally having a circular cross section, substantially vertical and open at their upper and lower ends, said distribution means being equipped with openings over at least a fraction of their height; and
  a plurality of removable baskets according to the first aspect and/or the second aspect arranged on the distribution means.

Apart from their support function for the removable baskets, the distribution means of the perforated tray can provide a guiding function during the installation of said removable baskets.

Another advantage of the filtration and distribution device is derived from the fact that the loading of the removable baskets with filtration medium can be done outside the reactor, which facilitates and greatly accelerates the operation, the latter then being limited to installing the loaded removable baskets above the perforated tray. Moreover, the height of the filtration particles in each removable basket can be adjusted very accurately, basket by basket.

According to one or more embodiments, the distribution means comprise a deflector element making it possible in particular to: support the removable baskets; close the upper end of the distribution means; prevent the introduction of the liquid phase via the opening of the upper end of the distribution means, while allowing the gaseous phase to pass into the side zone of the upper part of the distribution means.

According to one or more embodiments, the removable basket is suitable for being placed on the distribution means of a perforated tray of the reactor, the removable basket comprising support means cooperating with the distribution means of the perforated tray. According to one or more embodiments, the support means comprise the base of the removable basket.

According to one or more embodiments, the removable baskets are arranged in order to form a first tier of removable baskets on the distribution means. According to one or more embodiments, the removable baskets are arranged in order to form at least one additional tier of removable baskets on the first tier of removable baskets.

According to one or more embodiments, the removable baskets are arranged so that a chimney of the removable basket is in alignment with respect to one of the distribution means of the perforated tray, and the deflector element of said distribution means comprises openings allowing the passage of gas between said chimney of the removable basket and said distribution means. Thus, the access of gas through the filtration and distribution device is facilitated.

According to one or more embodiments, the removable baskets are arranged so that a chimney of the removable basket is offset with respect to the distribution means. Thus, the mixture of gas and liquid in the collection space between the base of the removable baskets and the perforated tray is facilitated.

According to one or more embodiments, the removable baskets of one and the same tier are arranged parallel to one another and offset with respect to the removable baskets of an adjacent tier. According to one or more embodiments, the removable baskets of one and the same tier are arranged perpendicularly to the removable baskets of an adjacent tier. Thus, the structural integrity of the successive tiers of removable baskets is reinforced.

According to one or more embodiments, the plurality of removable baskets is arranged in order to form a succession of pyramid-shaped tiers. Thus, the removable baskets can be arranged in the space below the upper base of the reactor, thus optimizing the available space in the reactor.

According to one or more embodiments, the support means comprise at least one of the side walls of the removable basket cooperating with the distribution means.

According to one or more embodiments, the support means comprise a tube fastened to the base of the removable basket the diameter of which is substantially greater than that of the distribution means, said tube being closed at an upper end and open at a lower end so that the tube is suitable for receiving a distribution means and thus for resting thereon.

According to one or more embodiments, the tube comprises one or more openings in a section adjoining its upper end so as to allow the gaseous phase to diffuse within the distribution means.

According to one or more embodiments the tube is permeable to the liquid phase and optionally capable of retaining the solid phase constituted by the filtration medium.

According to one or more embodiments, the tube is porous over its height so as to also allow the passage of the liquid phase accumulated at the level of the filtration medium into the distribution means. For example, the openings are distributed over the height of the tube with a regular pitch between the openings. Alternatively, the tube is produced from a perforated screen, for example of the Johnson type.

According to one or more embodiments, the support means comprise a plurality of vertical arms fastened to the base of the removable basket and equipped with attachment means configured to cooperate with the distribution means.

According to one or more embodiments, the removable baskets situated at the periphery of said filtration and distribution device have at least one side wall having a curvature. This embodiment makes it possible in particular to produce a filtration and distribution device that can match the curvature of the wall of the reactor in which it is installed, so as to cover the cross section of the reactor in a compact fashion.

According to one or more embodiments, two adjacent removable baskets are separated by a free space or functional clearance so as to allow their installation and their removal basket by basket. According to one or more embodiments, this free space is from 1 to 20 mm, such as from 1 to 10 mm.

According to a fourth aspect, the aforementioned purposes, as well as other advantages, are obtained by a reactor suitable for operating with co-current gas-liquid downflow comprising in the direction of flow of the fluids:
 a fixed catalyst bed; and
 a filtration and distribution device for a gaseous phase and a liquid phase according to the third aspect arranged upstream of the catalyst bed.

According to one or more embodiments, the filtration and distribution device is arranged in the reactor so that a substantially annular zone is left free between the wall of the reactor and the walls of the peripheral removable baskets adjacent to the wall of the reactor. According to one or more embodiments, the annular zone is from 2% to 50%, such as from 5% to 20%, of the cross section of the reactor.

According to one or more embodiments, the plurality of removable baskets is arranged in the reactor so as to fill an upper base zone (i.e. upper dome) of the reactor.

According to one or more embodiments, the reactor is a reactor suitable for operating with co-current gas-liquid trickle downflow having a liquid velocity comprised between 0.1 and 5 cm/s, for example comprised between 0.1 and 1 cm/s (in the case of the hydrotreating reactors) or comprised between 1.1 and 5 cm/s (in the case of the selective hydrogenation reactors).

According to one or more embodiments, for reasons of ease of maintenance, the removable baskets have a smaller dimension than that of an inspection hatch formed in the reactor.

According to a fifth aspect, the aforementioned purposes, as well as other advantages, are obtained by a hydrotreating and/or hydrocracking process of a hydrocarbon-containing feedstock containing at least one hydrocarbon fraction having a sulphur content of at least 0.5% by weight, and/or an initial boiling temperature of at least 300° C., and/or a final boiling temperature of at least 500° C., in which the feedstock is introduced into a reactor according to the fourth aspect. The application mainly under consideration is the catalytic treatment of heavy petroleum cuts, even if the filtration and distribution devices according to the present description can be applied to any treatment (e.g. hydrogenation) of petroleum cuts loaded with clogging particles or coke formation precursor elements, which may cause clogging of the fixed bed.

Embodiments according to the aspects referred to above, as well as other characteristics and advantages of the devices according to the aforementioned aspects, will become apparent on reading the following non-limitative description, given by way of illustration only, and with reference to the following drawings.

BRIEF DESCRIPTION OF THE DRAWINGS

Generally, similar elements are denoted by identical references in the figures.

DETAILED DESCRIPTION

According to the first aspect and the second aspect, the present description relates to a removable basket suitable for containing and holding at least one filtration medium for the filtration and pre-distribution of a gaseous phase and a liquid phase, and suitable for being arranged upstream of a fixed catalyst bed of a reactor operating with co-current gas-liquid downflow.

Figure 1:
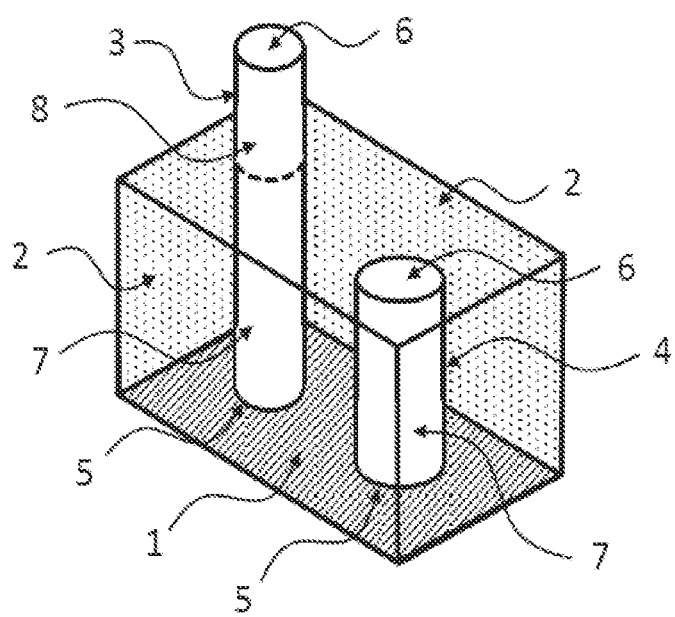
FIG. 1 is a diagrammatic profile view of a removable basket according to embodiments of the present description.
Figures 2, 3:
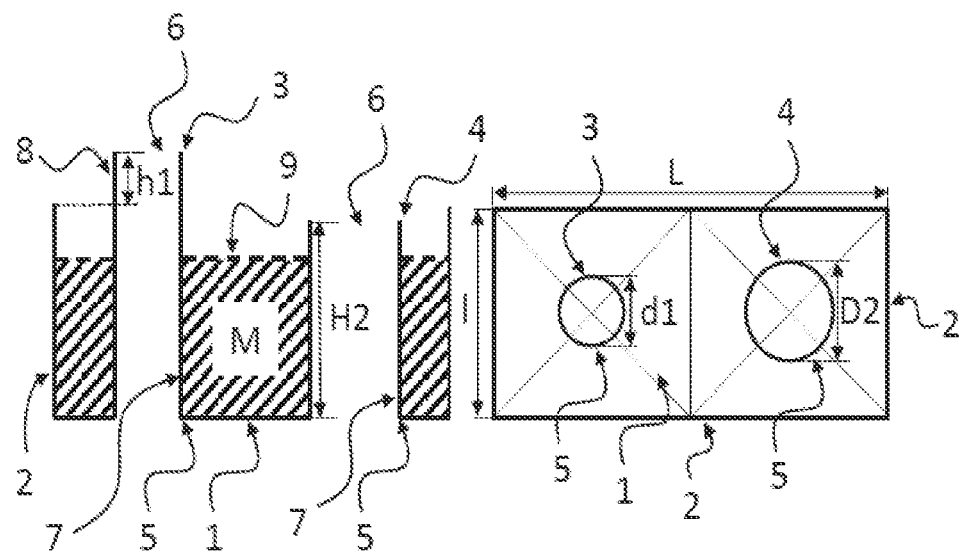
FIG. 2 is a diagrammatic cross section view of the removable basket in FIG. 1 on which a filtration medium is arranged.
FIG. 3 is a diagrammatic bottom view of the removable basket in FIGS. 1 and 2.

With reference to FIGS. 1, 2 and 3, the removable basket is intended to be filled with a filtration medium M and comprises a substantially horizontal base 1 and a plurality of substantially vertical side walls 2, preferably of the same height, the walls delimiting the cross section of the removable basket (i.e. horizontal cross section or cross section perpendicular to the height of the basket. In this example, the base 1 is permeable to the gas and to the liquid. On the other hand, according to the chosen configuration, at least one element chosen from the base and the side walls is permeable to the gas and to the liquid. In this example, the removable basket comprises four side walls 2 in order to form a rectangular parallelepiped. On the other hand, according to the chosen configuration, the removable basket can comprise a different number of side walls in order to form, for example, a prism that is triangular, square, hexagonal, etc. The removable basket can also comprise a single ellipsoidal side wall 2 in order to form a circular cylindrical cavity or comprise at least one curved side wall 2. For example, the removable baskets intended to be arranged along the wall of the reactor can have a curvature on at least one side wall 2.

The removable basket also comprises chimneys, such as a first chimney 3 and a second chimney 4, that are substantially vertical and open at their lower 5 and upper 6 ends. The first and second chimneys 3 and 4 each comprise a lower part 7 comprising the lower end 5 fastened to the base 1 and extending between the side walls 2. In addition, the first chimney 3 also comprises an upper part 8 extending above the side walls 2.

As indicated in FIGS. 1, 2 and 3, the upper part 8 of the first chimney 3 can be suitable for being inserted into a lower part 7 of a chimney of another removable basket, i.e. into a lower part 7 of a second chimney 4 of a removable basket according to the first and second aspects, such as for example substantially identical to the removable basket shown in FIGS. 1, 2 and 3. Thus, the removable baskets are stackable so that several tiers of removable baskets can be superimposed upstream of the catalyst bed of the reactor.

According to one or more embodiments, the lower 7 and upper 8 parts of the first chimney 3, as well as the lower part 7 of the second chimney 4 have a substantially tubular shape, so that the shape of the cross section of the upper part 8 of the first chimney 3 can be surrounded by the shape of the cross section of the lower part 7 of the second chimney 4. For example, as indicated in FIG. 3, the lower 7 and upper 8 parts of the chimneys 3 and 4 can form tubes having a circular cross section so that the diameter D2 of the lower part 7 of the second chimney 4 is greater than the diameter d1 of the upper part 8 of the first chimney 3. It is understood that the chimneys of the removable basket can be of any shape, with the proviso that the upper parts 8 of the chimneys of the removable basket are suitable for being inserted into the lower parts 7 of the chimneys of another removable basket according to the first and second aspect.

As indicated in FIG. 2, the height h1 of the upper part 8 of the first chimney 3 is smaller than or equal to the height H2 of the upper part 7 of the second chimney 4. Thus, the base 1 of the removable basket can be supported by the side walls 2 of another removable basket. In addition, if the filtration bed becomes blocked, the liquids can flow preferably with the gas into the chimneys of the removable basket.

As indicated in FIG. 2, the upper ends 6 of the first and second chimneys 3 and 4 are suitable for being situated above the layer of filtration medium M so that the liquid passes preferentially through the filtration bed.

In the example indicated in FIG. 3, two opposite first side walls 2 have a width L substantially equal to twice the width l of the other two side walls 2. Thus, the side walls form a cavity consisting of two adjacent square-based rectangular parallelepipeds. In this example, each of the first and second chimneys 3 and 4 is arranged at the centre of one of said square-based rectangular parallelepipeds. For example, the chimneys 3 and 4 are arranged at a distance substantially equal to L/4 from three of the side walls 2 and at a distance substantially equal to 3 L/4 from the fourth side wall 2. Thus, the removable baskets of one and the same tier of removable baskets can be arranged in a configuration perpendicular to that of the removable baskets of an adjacent tier. It is understood that other structural configurations are possible, so that removable baskets are stackable perpendicularly onto other removable baskets.

Figures 4, 5:
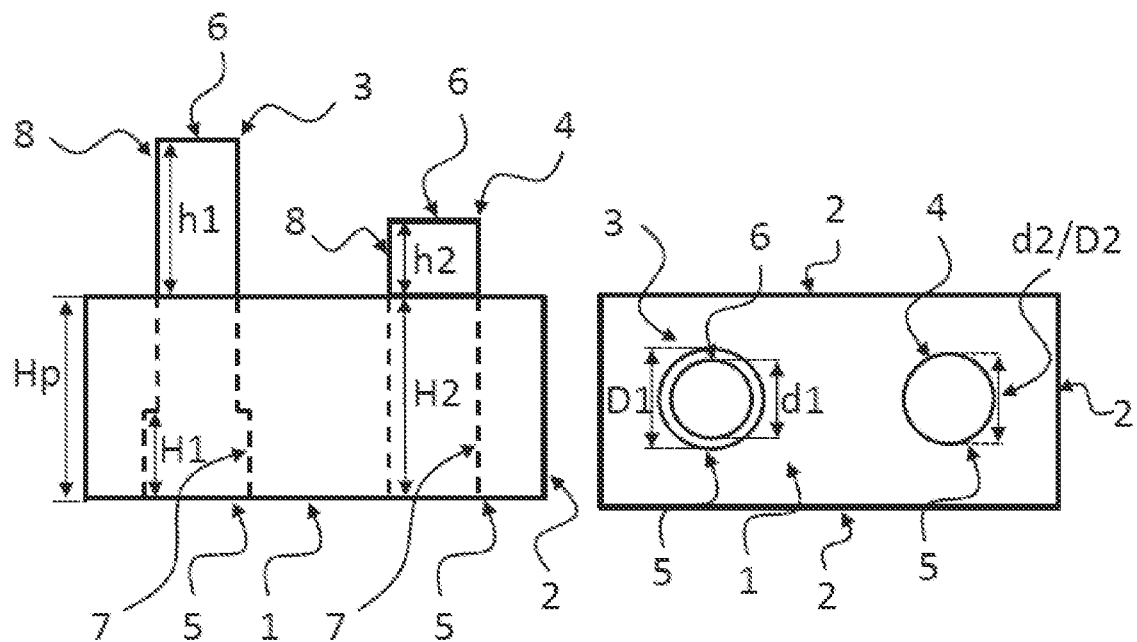
FIG. 4 is a diagrammatic side view of a removable basket according to embodiments of the present description.
FIG. 5 is a diagrammatic bottom view of the removable basket in FIG. 4.

According to one or more embodiments, the upper face of the removable basket is at least partially, preferably entirely, open in order to allow easy loading and unloading of the filtration medium M, these operations being able to be carried out when the reactor is stopped, and generally outside the latter. Moreover, the removable basket can comprise a perforated protective screen 9 (FIG. 2), optionally removable, arranged above the upper layer of filtration medium M in order to enclose the filtration medium M inside the removable basket. With reference to FIGS. 4 et 5, the second chimney 4 of the removable basket can comprise an upper part 8 extending above the side walls 2 so that the upper part 8 of the second chimney 4 is also suitable for being inserted into a lower part 7 of a chimney of another removable basket, i.e. into a lower part 7 of a first chimney 3 of a removable basket according to the first and second aspects, such as for example substantially identical to the removable basket shown in FIGS. 4 and 5.

According to one or more embodiments, the shape defined by the cross section of the lower part 7 of the first chimney 3 is suitable for surrounding the shape defined by the cross section of the upper part 8 of the second chimney 4. As the two chimneys 3 and 4 of the removable basket both extend above the side walls 2, the guiding for the superimposition of the baskets is improved. For example, as indicated in FIG. 5, the lower 7 and upper 8 parts of the chimneys 3 and 4 can form tubes having a circular cross section so that the diameter D1 of the lower part 7 of the first chimney 3 is greater than the diameter d2 of the upper part 8 of the second chimney 4. In this example, the diameter d2 of the upper part 8 and the diameter D2 of the lower part of the second chimney 4 are substantially equal. On the other hand, d2 and D2 can be different with the proviso that D2>d1 and D1>d2.

As indicated in FIG. 4, the height h2 of the upper part 8 of the second chimney 4 is smaller than or equal to the height H1 of the lower part 7 of the first chimney 3.

Figures 6, 7:
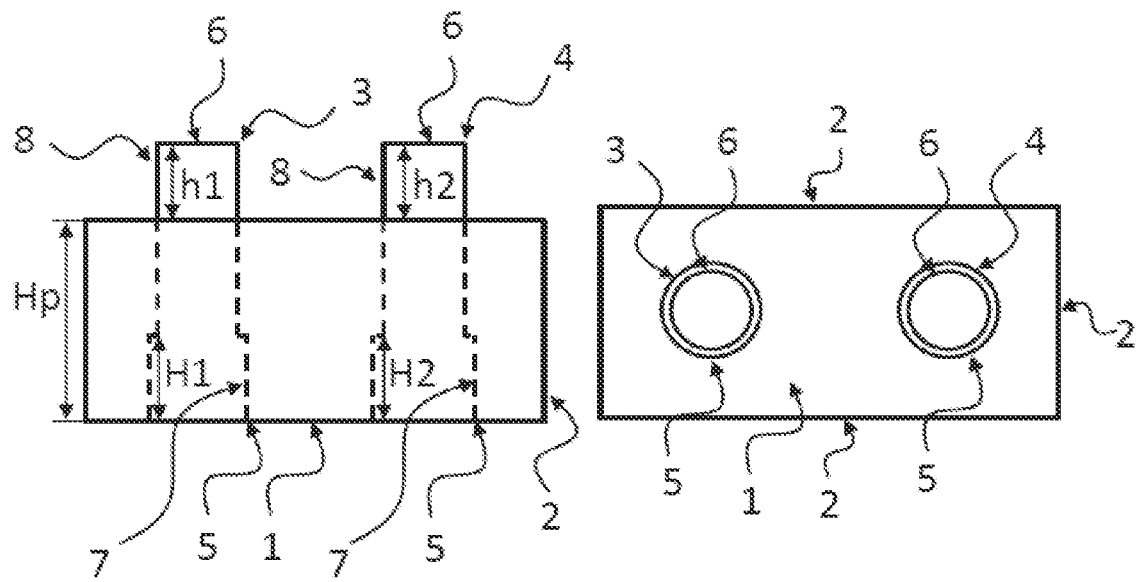
FIG. 6 is a diagrammatic side view of a removable basket according to embodiments of the present description.
FIG. 7 is a diagrammatic bottom view of the removable basket in FIG. 6.

With reference to FIGS. 6 and 7, the heights of the upper parts 8 of the first and second chimneys 3 and 4 can be substantially equal. Thus, a greater choice of orientation of the stackable baskets is obtained. It is understood that said heights of the upper parts 8 of the first and second chimneys 3 and 4 can be different, so that the stacking of the removable baskets is pre-orientated. In this example, the diameters d1 and d2 of the upper parts 8 of the first and second chimneys 3 and 4 are substantially equal; the diameters D1 and D2 of the lower parts 7 of the first and second chimneys 3 and 4 are substantially equal. It is understood that other configurations are possible with the proviso that D2>d1 and D1>d2.

According to one or more embodiments, with reference to FIGS. 4 and 6, when the height H1 of the lower part 7 of the first chimney 3 and/or the height H2 of the lower part 7 of the second chimney 4 are less than the height Hp of the side walls 2, the corresponding chimney can also comprise an intermediate part extending above the lower part 7, for example extending from the lower part 7 to the upper part 8 of said chimney.

Figures 8, 9:
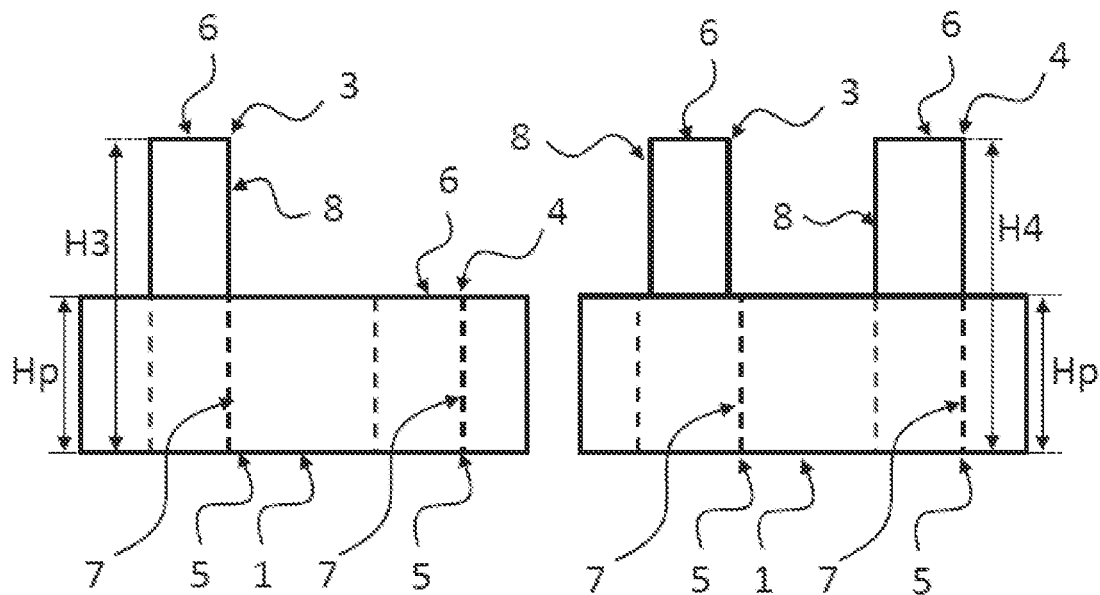
FIG. 8 is a diagrammatic side view of a removable basket according to embodiments of the present description.
FIG. 9 is a diagrammatic side view of a removable basket according to embodiments of the present description.

With reference to FIG. 8, at least one of the first and second chimneys 3 and 4 can have a height (H3 and/or H4) substantially equal to twice the height Hp of the side walls 2. With reference to FIG. 9, the heights H3 and H4 are substantially equal to twice the height Hp of the side walls 2. In other words, in the example in FIG. 9, the heights h1, h2, H1 and H2 are substantially equal.

Figure 10:
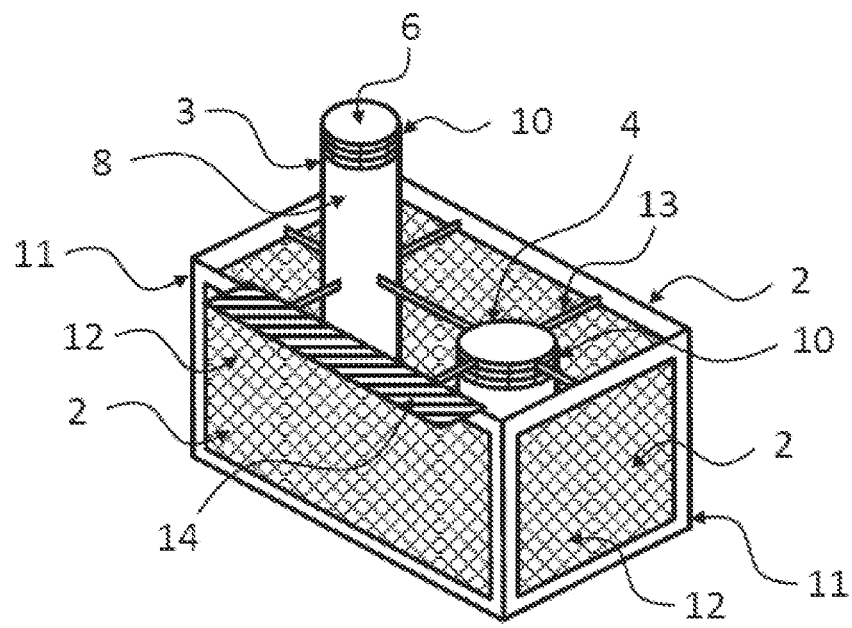
FIG. 10 is a diagrammatic profile view of a removable basket according to embodiments of the present description.

With reference to FIG. 10, at least one of the upper ends 6 of the first and second chimneys 3 and 4 can comprise a screen 10, making it possible in particular to avoid any splashes of unfiltered liquid passing directly through the first chimney 3 and/or the second chimney 4. In addition, the base 1 and/or the side walls 2 can comprise a peripheral reinforcement 11, making it possible in particular to reinforce the integrity of the removable basket, and/or an openwork separation element 12, such as a screen or metal plate that is permeable to the gas and/or to the liquid. In addition, at least one of the plurality of chimneys 3 and 4 of the removable basket can also is openwork so as to be permeable to gas.

As indicated in FIG. 10, the removable basket can also comprise reinforcements 13 suitable for stiffening the removable basket, the reinforcements 13 being able to act in particular as attachment points for the removable basket during handling. In this example, the reinforcements 13 are connected to the chimneys 3 and 4 and to the side walls 2. It is understood that the reinforcements 13 can also connect side walls 2 to one another and/or the base 1 to at least one element selected from the chimneys 3 and 4 and the side walls 2. Moreover, the removable basket can comprise a connecting element 14, such as a tab (e.g. plate) for connecting a side wall 2 of the removable basket to a side wall of an adjacent removable basket and optionally covering the space between the removable basket and the adjacent removable basket. According to one or more embodiments, the connecting element 14 can be firmly fixed to the removable basket. Thus, the structural integrity of the tiers of removable baskets is reinforced and the liquid passes preferentially through the filtration bed. According to one or more embodiments, the assembly of removable baskets is adjusted so as to cover the entire cross section of the reactor, leaving only an annular space free in the reactor as well as a free space or functional clearance between the side walls of the adjacent removable baskets so as to allow them to be moved individually for insertion or withdrawal as well as for positioning the connecting elements 14.

Figure 11:
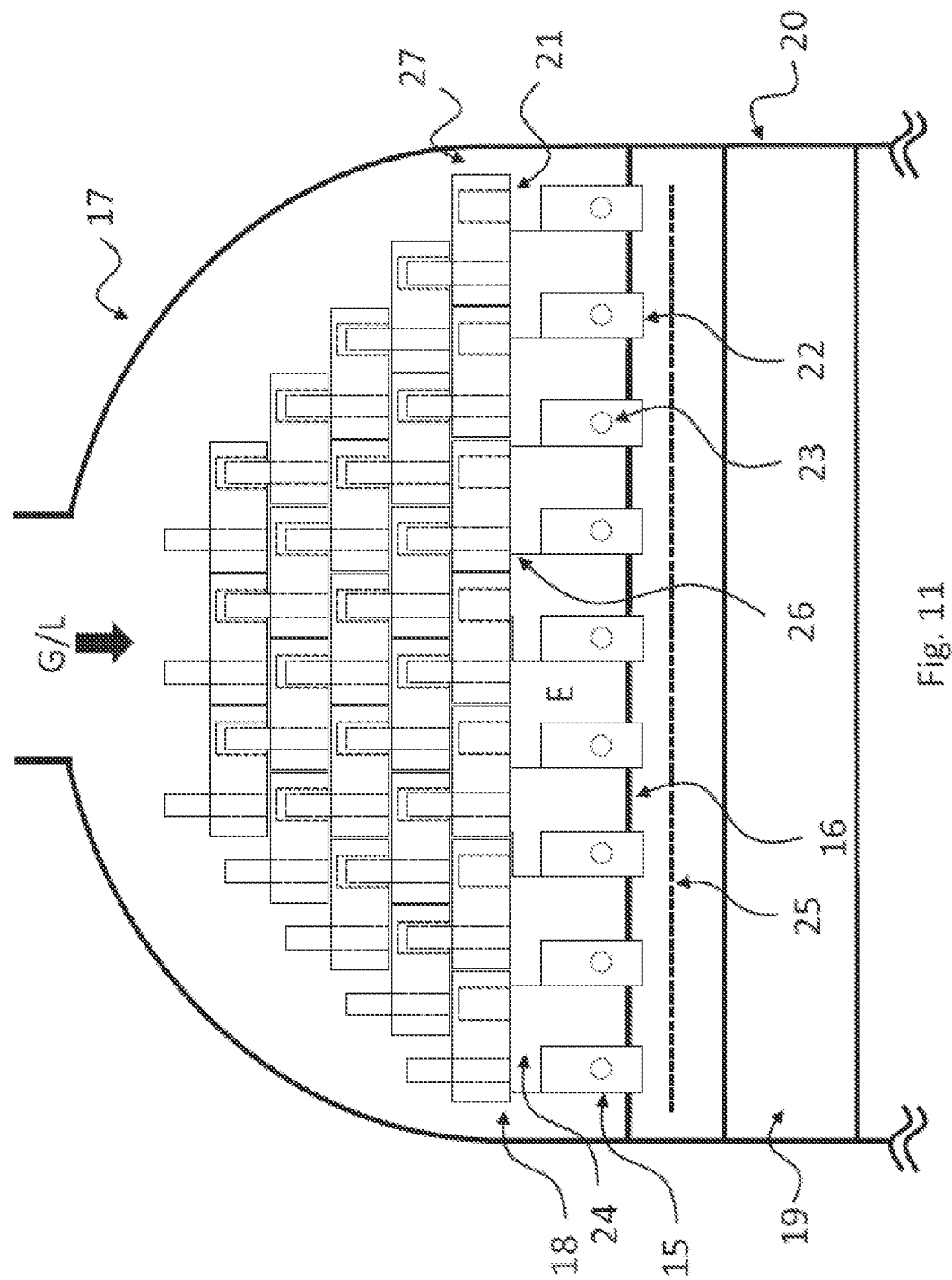
FIG. 11 is a diagrammatic cross section view of a part of a reactor comprising a filtration and distribution device according to embodiments of the present description.

With reference to FIG. 11, the removable basket can be suitable for being arranged on distribution means 15 of a perforated tray 16 of the reactor 17, the removable basket comprising support means 18 cooperating with the distribution means 15 of the perforated tray 16. Thus, the mounting and dismantling operations are still facilitated, given that the removable baskets are supported directly by the distribution means 15.

According to the third aspect, the present description also relates to a filtration and distribution device for a gaseous phase and a liquid phase intended for feeding a catalytic reactor operating on a gas and liquid feedstock, preferably under a flow regime called trickle regime, i.e. having a liquid surface velocity comprised between 0.1 cm/s and 5 cm/s.

As indicated in FIG. 11, the filtration and distribution device for liquid and gaseous phases can be arranged upstream of a fixed catalyst bed 19 of a reactor 17 operating with co-current gas-liquid downflow. In this example, the enclosure (jacket) of the reactor 17 is delimited by a wall 20, generally having a circular cross section. The filtration and distribution device comprises a perforated tray 16 (also called distributor tray, solid tray or solid plate) the function of which is to convert the two-phase jet entering the reactor 17 into a gas/liquid mixture that is uniformly distributed over the surface of the fixed catalyst bed 19 placed downstream of said perforated tray 16 and which optionally incorporates a filtration function by the installing of one or more filtration layers.

With reference to FIG. 11, the filtration and distribution device comprises the perforated tray 16 on which are fastened distribution means 15, such as vertical chimneys, passing through the perforated tray 16. For example, the distribution means 15 can be closed at their upper ends 21 and open at their lower ends 22 and optionally perforated with lateral apertures 23 distributed over the height of the distribution means 15. It should be noted that the lateral apertures 23 formed in the distribution means 15 can be in the form of slots. Each distribution means 15 also comprises a lateral opening 24 situated below the closed upper end 21 in order to allow the introduction of the gaseous phase.

According to one or more embodiments, the perforated tray 16 comprises a cross section that corresponds to that of the enclosure of the reactor 17. For example, if the reactor 17 has a circular cross section, the dimension of the cross section of the perforated tray 16 corresponds to that of the internal diameter of the reactor 17.

As indicated in FIG. 11, the lower end 22 of the distribution means 15 opens out level with, or below, the perforated tray 16 and above the fixed catalyst bed 19. According to one or more embodiments, the reactor also comprises a dispersal element 25 (e.g. a metal screen), arranged below the perforated tray 16, the function of which is to break and disperse the jet of gas/liquid mixture which is expelled from the lower end 22 of the distribution means 15. It will be noted that the open upper end 21 of the distribution means 15 is capped with a deflector element 26, such as a plate, which prevents the introduction of the liquid phase via the lateral opening 24 adjacent to the upper end 21, but allows the gaseous phase to pass into the side zone of the upper part.

As indicated in FIG. 11, the filtration and distribution device also incorporates a filtration function provided by a plurality of removable baskets according to the first aspect and/or the second aspect arranged above the perforated tray 16 and which are supported thereby. In this example, the removable baskets are stacked in several tiers in one and the same plane (the longest edges of all the baskets are parallel to one another). The removable basket also comprises support means 18 cooperating with the distribution means 15 of the perforated tray 16. In the example in FIG. 11, the support means 18 correspond to the base 1 of the removable basket, the main dimensions of which (e.g. length and width; diameter) are substantially greater than those of the distribution means 15. Apart from their support function for the removable baskets, the distribution means 15 of the perforated tray 16 can provide a guiding function during the installation of said removable baskets in the reactor 17. According to one or more embodiments, when the removable basket is arranged so that one of its chimneys is aligned with a distribution means 15 of the perforated tray 16, the deflector element 26 of said distribution means 15 comprises openings allowing the passage of the gaseous fluid between the chimney of the removable basket and the distribution means 15. According to one or more embodiments, the base 1 of the removable basket and/or the deflector element 26 respectively comprise complementary positioning elements (of the male/female type) suitable for engaging with one another, thus ensuring that the removable basket is held in place with respect to the perforated tray 16.

According to one or more embodiments, the removable baskets are arranged so that a chimney of the removable basket is offset with respect to the distribution means 15. Thus, the mixture of gas and liquid in the collection space E between the base of the removable baskets and the perforated tray 16 is facilitated.

Advantageously, the used of fastening elements such as screws for fastening the removable baskets is not necessary, as the removable baskets can be positioned side by side, in rows, so that the support means 18 cooperate with the distribution means 15. It will be noted that the support means 18 can correspond to other elements of the removable basket. For example, according to one or more embodiments, the support means 18 comprise at least one of the first and second chimneys 3 and 4 of the removable basket cooperating with the distribution means 15 so that the distribution means 15 can be inserted into the lower parts 7 of the chimneys of the removable baskets. According to one or more embodiments, an overhang extending inwards can be provided in the lower parts 7 of the chimneys 3 and 4 of the removable basket, the overhang being suitable for resting on the distribution means 15. According to one or more embodiments, the distribution means 15 can be devoid of the deflector elements 26 in order to allow better passage of the gas.

According to one or more embodiments, the support means 18 can be defined as indicated in document FR 3043339. According to one or more embodiments, the support means 18 comprise at least one of the side walls 2 of the removable basket cooperating with the distribution means 15. According to one or more embodiments, the support means 18 can be presented in the form of a tube (not shown) fastened to the base 1 of the removable basket, the diameter of which is substantially greater than that of the distribution means 15. The tube is closed at its upper end by a plate and open at its lower end so that the tube is suitable for receiving a distribution means 15 of the perforated tray 16. Once the removable basket is installed, it rests on the distribution means 15 via the plate of the tube fastened to the base 1 of the removable basket. It will be noted furthermore that the section adjacent to the upper end of said tube can comprise openings which communicate with the lateral opening 24 of the distribution means 15 on which it is mounted so as to allow the passage of the gaseous flow in the tube then in the distribution means 15 of the perforated tray 16. According to one or more embodiments, which the distribution means 15 are equipped with apertures distributed over their height, the tubes are also porous over at least the lower half of their height, for example over their entire height, in order to allow the passage of the cleaned liquid phase from the removable baskets into the distribution means 15. According to one or more embodiments, the support means 18 are presented in the form of vertical arms (not shown) fastened to the base 1 of the removable basket and said arms are equipped with attachment means configured in order to cooperate with the distribution means 15, for example at the level of the lateral opening 24 of the distribution means 15 or at any level of the distribution means.

As indicated in FIG. 11, the support means 18 of the removable baskets and the distribution means 15 of the perforated tray 16 can be arranged so as to create the collection space E (also called liquid mixing zone E) for the liquid phase between the base 1 of the removable baskets and the perforated tray 16.

According to one or more embodiments, as indicated in FIG. 11, the removable baskets are arranged in order to form at least one tier of removable baskets on the distribution means 15.

According to one or more embodiments, as indicated in FIG. 11, the section exhibiting all of the removable baskets of the filtration and distribution device does not occupy the whole of the section of the reactor 17. There may in fact be an annular space 27 between the filtration zone of the so-called "peripheral" removable baskets and the wall 20 of the reactor. This annular space 27 allows liquid to pass into the collection zone E even in the situation in which the filtration medium M is clogged by the different impurities recovered over time.

In the event that the filtration function is no longer provided by the removable baskets, the perforated tray 16 can nevertheless continue to function via the lateral apertures 23 of the distribution means 15 which are situated in the liquid mixing zone E. The width of this annular space is established so that the pressure balance is maintained, even in the event that the tray is totally clogged. According to one or more embodiments, the annular zone 27 corresponds to from 2% to 50%, for example from 5% to 20%, of the cross section of the reactor.

When the filtration and distribution device is utilized in the reactor 17, the removable baskets can be filled with one or more layers of filtration medium M, the filtration medium being able to be inert or active. For example, the layer of filtration medium M can comprise filtration elements called protective filtration elements, over a height that is generally comprised between 100 mm and 1500 mm, preferably between 150 mm and 500 mm, such as 300 mm.

The filtration elements constituting said layer can be:
filtration additives;
particles of guard material or any other particles serving generally as protective elements, for example marketed by Axens;
a catalyst support or a catalyst (fresh or used or regenerated).

These filtration elements are preferably granular catalysts, beads or extrudates having a particle diameter comprised between 0.5 and 5 mm, preferably between 1 and 3 mm. These catalysts are preferably composed of an active phase containing transition metals on a support containing alumina. It is understood that the filtration elements can comprise any material capable of retaining the clogging particles contained in the feedstock, such as for example a crosslinked ceramic or metallic material, for example marketed by Unicat or Crystaphase. These crosslinked materials can be presented in the form of cakes having a circular cross section from 3 to 5 cm in diameter and height comprised between 1 and 3 cm. It should be noted that the filtration elements can take different forms such as for example beads, multilobed cylinders, simple cylinders, a tube that is hollow or also in the form of a cartwheel; this list being non-limitative.

In most cases, a single layer of filtration medium per removable basket is sufficient, such as a layer having a thickness comprised between 100 mm and 1500 mm, preferably between 150 mm and 500 mm, such as 300 mm. However, several layers of filtration medium can be used per removable basket, preferably with the size of the filtration elements of a given layer being less than that of the filtration elements constituting the layer immediately above. According to one or more embodiments, the layer in contact with the base 1 of the basket can exceptionally be more porous than a layer of filtration medium arranged above the latter, for example in the case of use of a very fine catalyst in order to avoid blocking the base 1 of the removable basket or having a perforated base 1 of the removable basket that is too fine. According to one or more embodiments, the diameter of the layer in contact with the base is 2 to 10 times, for example 4 times, greater than the diameter of the upper layer, in order to avoid in particular the mixing and segregation of the particles.

The operation of the filtration and distribution device installed in a co-current downflow reactor 17 having a gaseous phase and a liquid phase is described below with reference to FIG. 11. Generally, the filtration and distribution device according to the third aspect is positioned upstream of the catalyst bed 19 (in the direction of flow of the fluids). When the gas/liquid two-phase feedstock is introduced in staged fashion on different catalyst beds staggered along the reactor 17, it is possible to position a filtration and distribution device upstream of each of the catalyst beds. The gas/liquid mixture is sent to the head of the filtration and distribution device as indicated by the arrow G/L. The gaseous fraction of the mixture that enters the distribution means 15 via the lateral openings 24 after passing through the chimneys 3 and 4 of the removable baskets (and optionally through the upper openings of the tube when the support means 18 is presented in the form of a tube), is then directed below the perforated tray 16.

As for the liquid fraction that is prevented from passing into the upper part of the distribution means 15 by the deflector elements 26 (see FIG. 11), it is collected in the removable baskets and percolates through the layer or layers of filtration medium M contained in the removable baskets. Bringing the liquid phase into contact with the filtration medium M makes it possible to retain the particles responsible for the fouling of the catalyst bed, so as to supply a "cleaned" liquid which diffuses through the apertures of the base 1 of the removable baskets. The cleaned liquid is thus collected in the collection space E. The cleaned liquid accumulated in the collection space E then diffuses into the distribution means 15 via the openings 23 opening out into this space and is mixed with the gaseous phase that circulates in the distribution means 15. The cleaned gas/liquid mixture is evacuated from the distribution means 15 via the open lower ends 22 below the perforated tray 16. The jet of gas/liquid mixture is then dispersed when it meets the dispersal element or elements 25 arranged between the catalyst bed 19 and the perforated tray 16.

Figure 12:
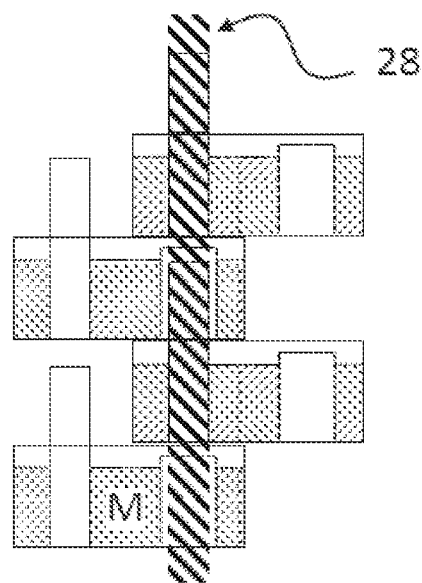
FIG. 12 is a diagrammatic side view of removable baskets according to embodiments of the present description on which filtration media are arranged.

As indicated in FIG. 12, the removable baskets can be stacked so as to be parallel but offset from one tier to another. Thus, the structural integrity of the tiers of removable baskets is reinforced. In addition, via the arrangement of removable baskets so that the chimneys of each tier of removable baskets are aligned with chimneys of an adjacent tier of removable baskets, FIG. 12 also makes it possible to show the formation of a preferential gas pathway 28 through the tiers of removable baskets. Thus, the distribution of gas in the central part of the reactor 17 is promoted, improving the evenness of flow of the phases within the catalyst bed. In addition, if the filtration bed were to become blocked, the liquids could flow back up along the walls and chimneys, then flow with the gas into the chimneys of the removable basket, preserving a balance of the distribution of the fluids below the perforated tray 16. It will be noted that the formation of a preferential gas pathway 28 can be obtained with the proviso that the upper part 8 of the first chimney 3 is suitable for being inserted into a lower part 7 of a chimney of another removable basket.

Figure 13:
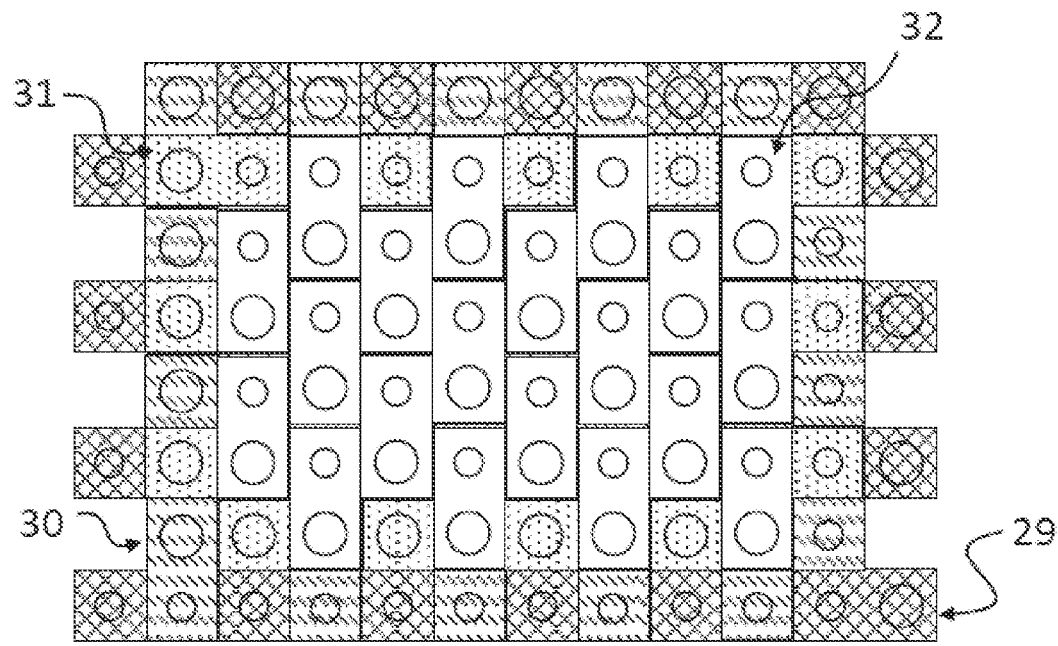
FIG. 13 is a diagrammatic top view of removable baskets according to embodiments of the present description.

As indicated in FIG. 13, the removable baskets of one and the same tier can also be arranged in a configuration perpendicular to that of the removable baskets of an adjacent tier, in particular making it possible to reinforce the structural integrity of the tiers of removable baskets. In addition, such a configuration allows a pyramidal arrangement of the tiers of removable baskets as shown in the example in FIG. 13, in which:

a first tier 29 comprises 44 removable baskets,
a second tier 30 comprises 35 removable baskets, arranged perpendicularly to the removable baskets of the first tier 29,
a third tier 31 comprises 27 removable baskets, arranged perpendicularly to the removable baskets of the second tier 30, and
a fourth tier 32 comprises 20 removable baskets, arranged perpendicularly to the removable baskets of the third tier 31.

Thus, a space gain is obtained because such a pyramidal arrangement makes it possible to arrange the removable baskets in the space below the upper base of the reactor 17, as shown diagrammatically in FIG. 11.

According to the fourth aspect, the present description also relates to a reactor 17 suitable for operating with co-current gas-liquid downflow, comprising in the direction of flow of the fluids: a fixed catalyst bed, and a filtration and distribution device for a gaseous phase and a liquid phase according to the third aspect arranged upstream of the catalyst bed.

According to one or more embodiments, the reactor 17 can be of the elliptical or hemispherical type. In the example in FIG. 11, the upper base of the reactor 17 comprises an inlet tubing having a predefined diameter, allowing the intake of gaseous and liquid fluids, and is generally equipped with a feed diffuser (not shown). The inlet tubing can optionally be mounted on an inspection hatch (not shown), so as to facilitate access by personnel and for the removable baskets. The lower base (not shown) of the reactor 17 comprises an outlet tubing (not shown) having a predefined diameter, allowing the outlet of the fluids, and is generally equipped with an outlet collector (not shown). The jacket of the reactor 17 is equipped with internals, and in particular with the filtration and distribution device. The catalyst bed 19 of the reactor 17 is situated below the dispersal element 25.

According to the fifth aspect, the removable baskets, the filtration and distribution device and the reactor 17 according to the present description can be applied in particular to the processes for hydrotreating and/or hydrocracking a hydrocarbon-containing feedstock containing at least one fraction of hydrocarbons having a sulphur content of at least 0.5% by weight with respect to the total weight of the hydrocarbon-containing feedstock, and/or an initial boiling temperature of at least 300° C. and/or a final boiling temperature of at least 500° C. According to one or more embodiments, the hydrocarbon-containing feedstock comprises at least one of the following characteristics: at least 1% by weight, such as between 1 and 2% or between 2 and 4% by weight of sulphur with respect to the total weight of the hydrocarbon-containing feedstock, an initial boiling temperature of at least 350° C. and a final boiling temperature of at least 520° C., such as at least 540° C. According to one or more embodiments, the hydrocarbon-containing feedstocks capable of being treated by means of the perforated tray 16 can be defined in particular as those the boiling point of which is above 350° C., in particular of the vacuum distillate type, residue or similar, vacuum gasoil, atmospheric residues, vacuum residues, deasphalted oils, or also residues or vacuum distillates originating from conversion processes such as for example coking, fixed-bed, ebullating-bed or moving-bed hydrotreating or hydrocracking. All these types of residues or vacuum distillates can be alone or in a mixture. These heavy feedstocks can be used as they are, or diluted with a hydrocarbon fraction or a mixture of hydrocarbon fractions. The heavy feedstocks to which the present description relates can also comprise cuts originating from the coal liquefaction process, from aromatic extracts, or any other hydrocarbon cuts.

According to one or more embodiments, the hydrotreating process and/or the hydrocracking process are implemented at a temperature comprised between 300° C. and 500° C., such as between 350° C. and 430° C., and under an absolute pressure comprised between 5 MPa and 35 MPa, such as between 11 MPa and 26 MPa. According to one or more embodiments, the hourly space velocity of the hydrocarbon-containing feedstock defined as being the volumetric flow rate of the hydrocarbon-containing feedstock divided by the total volume of the catalyst, is comprised within a range from 0.1 $h^{-1}$ to 5 $h^{-1}$, such as between 0.1 and 2 $h^{-1}$. According to one or more embodiments, a quantity of hydrogen mixed with the hydrocarbon-containing feedstock is comprised between 100 et 5000 normal cubic metres ($Nm^3$) per cubic metre ($m^3$) of hydrocarbon-containing feedstock, such as between 200 and 2000 $Nm^3/m^3$.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 17/59.796, filed Oct. 18, 2017, are incorporated by reference herein.

Examples

Illustrative examples of the dimensioning of a removable basket and a filtration and distribution device according to the present description are described below.

The dimensions of the removable baskets are:
L: 300 mm;
l: 150 mm;
Hp: 100 mm.

The rectangular base 1 of each removable basket is equipped with two apertures surmounted by chimneys in the form of circular tubes open at their lower and upper ends. The dimensions of the chimneys of the removable basket are:
H3: 180 mm; Hp+h1
H4: 120 mm; Hp+h2
h1: 80 mm;
H1: 100 mm;
h2: 20 mm;
H2: 100 mm;
d1: 50 mm;
D1: 60 mm;
d2: 50 mm;
D2: 60 mm.

The removable baskets can thus contain a filtration medium M, composed for example of one or two different layers, the total thickness of which is 80 mm measured from the base of the removable basket.

The characteristics of the perforated tray 16 which supports 680 vertical chimneys are as follows:
diameter of the perforated tray 16: 5.5 m.

The dimensions of the vertical chimneys of the perforated tray 16 are:
- height of the chimneys of the perforated tray 16: 440 mm from the perforated tray;
- external diameter of the chimneys of the perforated tray 16: 50 mm;
- pitch between the chimneys of the perforated tray 16: 150 mm.

The chimneys of the perforated tray 16 comprise two rows of apertures for intake of the liquid:
- row 1 of apertures: height with respect to the perforated tray 16 of 40 mm, 3 5-mm holes;
- row 2 of apertures: height with respect to the perforated tray 16 of 130 mm, 3 5-mm holes;
- opening for the passage of the gas at the top of the gas intake chimney: 50 mm.

The device also comprises 65 removable baskets having a rectangular cross section that can be arranged on the chimneys of the perforated tray 16. In these examples, the removable baskets are supported via their base 1, resting on the chimneys of the perforated tray 16.

In these examples, the removable baskets are rectangular parallelepipeds and the chimneys 3 and 4 are tubes having a circular cross section. It is understood that the removable baskets and the chimneys 3 and 4 can have other shapes, such as baskets having a triangular, square, hexagonal or circular cross section, and/or tubes having an elliptical or polygonal cross section (e.g. having a triangular, rectangular, etc. cross section) respectively.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A removable basket suitable for containing and holding at least one filtration medium (M) for filtration and distribution of a gaseous phase and a liquid phase, and which can be suitable for being arranged upstream of a fixed catalyst bed (19) of a reactor (17) operating with a co-current gas-liquid downflow, said removable basket comprising:
   a substantially horizontal base (1) and a plurality of substantially vertical side walls (2) and/or at least one ellipsoidal side wall (2), the base (1) and/or at least one side wall (2) being permeable to gas and liquid; and
   a plurality of chimneys (3, 4) that are substantially vertical and open at their lower (5) and upper (6) ends, each chimney comprising a lower part (7) comprising the lower end (5) fastened to the base (1) and extending between the side walls (2),
   in which
   a first chimney (3) of the removable basket comprises an upper part (8) extending above the side walls (2),
   the upper part (8) of the first chimney (3) is suitable for being inserted into a lower part (7) of a chimney of another removable basket of the same type, and
   said upper part (8) of the first chimney (3) having a height (h1) that is smaller than or equal to a height (H2) of the lower part (7) of a second chimney (4) of the removable basket.

2. The removable basket according to claim 1, in which the chimneys (3, 4) form tubes having a circular cross section, and the diameter (D2) of the lower part (7) of a second chimney (4) of the removable basket is greater than the diameter (d1) of the upper part (8) of the first chimney (3).

3. The removable basket according to claim 1, also comprising a second chimney (4) comprising an upper part (8) extending above the side walls (2), and in which the upper part (8) of the second chimney (4) is suitable for being inserted into a lower part (7) of a chimney of another removable basket.

4. The removable basket according to claim 3, in which the second chimney (4) has a height (h2) of the upper part (8) smaller than or equal to the height (H1) of the lower part (7) of the first chimney (3).

5. The removable basket according to claim 3, in which the chimneys (3, 4) form tubes having a circular cross section, and in which the diameter (D1) of the lower part (7) of the first chimney (3) is greater than the diameter (d2) of the upper part (8) of the second chimney (4).

6. The removable basket according to claim 1, comprising four substantially vertical side walls (2), in which two first opposite side walls (2) have a width (L) substantially equal to twice the width (l) of two other side walls (2) in order to form a rectangular parallelepiped comprising a cavity consisting of two adjacent square-based rectangular parallelepipeds, each of first and second chimneys (3, 4) being arranged at the center of one of the square-based rectangular parallelepipeds.

7. The removable basket according to claim 1, in which at least one of the upper ends (6) of the plurality of chimneys (3, 4) of the removable basket comprises a screen (10).

8. The removable basket according to claim 1, in which the base (1) and/or the side walls (2) comprise a peripheral reinforcement (11).

9. The removable basket according to claim 1, also comprising at least one reinforcement (13) suitable for stiffening the removable basket.

10. The removable basket according to claim 1, also comprising a perforated protective screen (9), suitable for being arranged above an upper layer of filtration medium (M).

11. The removable basket according to claim 1, also comprising a connecting element (14) for connecting a side wall (2) of the removable basket to a side wall (2) of an adjacent removable basket.

12. A device performing filtration and distribution of a gaseous phase and a liquid phase, suitable for being arranged upstream of a fixed catalyst bed (19) of a reactor (17) operating with co-current gas-liquid downflow, comprising:
   a perforated tray (16) extending in a horizontal plane on which are fastened distributors (15) that are substantially vertical and open at their upper (21) and lower (22) ends, said distributors (15) being equipped with openings (23) over at least a fraction of their height; and
   a plurality of removable baskets according to claim 1 arranged on the distributors (15).

13. A reactor (17) suitable for operating with co-current gas-liquid downflow comprising in the direction of flow of fluids:
   a fixed catalyst bed (19); and
   a device performing filtration and distribution of a gaseous phase and a liquid phase according to claim 12 arranged upstream of the catalyst bed (19).

14. A process comprising hydrotreating and/or hydrocracking of a hydrocarbon-containing feedstock containing at least one hydrocarbon fraction having a sulphur content of at least 0.5% by weight with respect to the total weight of the hydrocarbon-containing feedstock, and/or an initial boiling temperature of at least 300° C., and/or a final boiling temperature of at least 500° C., in which the feedstock is introduced into a reactor according to claim 13.

\* \* \* \* \*